United States Patent
Okano et al.

[15] 3,682,055
[45] Aug. 8, 1972

[54] LENS CAP FOR CAMERA

[72] Inventors: Takeshi Okano, Amagasaki; Masakazu Nagai, Ashiya, both of Japan

[73] Assignee: Konan Camera Laboratory Company Limited, Kobe, Japan

[22] Filed: Jan. 27, 1970

[21] Appl. No.: 6,070

[30] Foreign Application Priority Data

Jan. 31, 1969 Japan ......................44/9060
Jan. 31, 1969 Japan ......................44/9061

[52] U.S. Cl. ...............................................95/1.1
[51] Int. Cl. .........................................G03b 17/24
[58] Field of Search ..................................95/1.1

[56] References Cited

UNITED STATES PATENTS

| | | |
|---|---|---|
| 2,608,919 | 9/1952 | Kramer ..................95/1.1 |
| 3,082,424 | 3/1963 | Laird ..................95/1.1 X |
| 3,046,857 | 7/1962 | Kargl ..................95/1.1 |
| 1,117,159 | 11/1914 | Borst ..................95/1.1 |

Primary Examiner—Samuel S. Matthews
Assistant Examiner—Michael L. Gellner
Attorney—Otto John Munz

[57] ABSTRACT

The present invention provides a lens cap for camera having a window through which the date or data of photographing carried by a dial or dials can be photographed on the film of a camera with said lens cap on.

1 Claim, 4 Drawing Figures

PATENTED AUG 8 1972

3,682,055

INVENTORS
TAKESHI OKANO
MASAKAZU NAGAI

LENS CAP FOR CAMERA

The present invention relates to a lens cap for a camera. The prior art relating to lens caps only protects the photographing lens when the camera is not in operation. As of date, there has not been a lens cap arrangement produced which records on the film the date or data of photographing or like characters.

Accordingly, it is an object of the present invention to provide a lens cap capable of not only protecting the lens, but also permitting such records as the date or data of photographing to be photographed on the film.

A further object of the present invention is to provide a lens cap arrangement in a photographic camera having a housing for containing film wherein data may be recorded on the film by its mere exposure. A lens cap is mounted on the housing. The cap is shaped in the form of a hollow cylinder having an inner surface and an outer surface. The cylinder has an open end and includes a circular bottom plate for closing the other end. The bottom plate has a recess offset from the center of the circular bottom plate. A window is provided in the recess for permitting the entrance of light beams through the window. A lens is concentrically mounted with respect to the inner cylindrical surface and is arranged in axial alignment with the window for permitting the passage of the light beams from the window to the film. A plurality of dial rings is rotatably mounted in the recess. The rings have multiple rotatably settable members of the type in which each settable member may be independently chosen and revolved to a selected one of a plurality of set positions. Each of the rings have offset portions for tightly engaging one another to provide a compact manipulatable data arrangement within said recess.

The invention consists in the novel combination of a data carrying lens cap positioned in the ray path traversing a camera body so that upon exposure of the film the selected data on the lens cap are photographically recorded on the film. Other objects and advantages of the invention will be apparent from the following description in conjunction with the accompanying drawing, in which like reference numerals refer to like parts throughout the several figures, and wherein.

Figure 1:
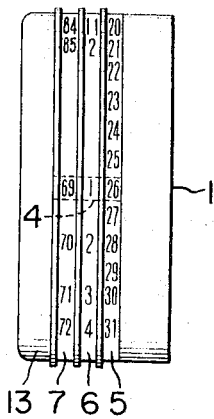
FIG. 1 is a side view of an embodiment of the lens cap according to the present invention.
Figure 2:
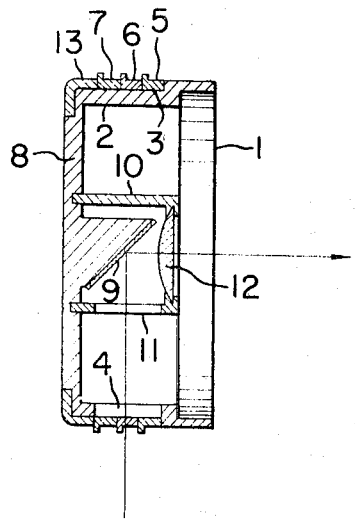
FIG. 2 is a cross-sectional plan view of the lens cap of FIG. 1.

Referring to FIGS. 1 and 2, a window 4 is formed in the peripheral surface of a bottomed cylindrical shaped lens cap 1, on which an offset shoulder 3 is provided. Rotatably fitted on the offset shoulder 3 are data carrying dial rings 5, 6 and 7, said data being opposite a window 4. A stopper ring 13 is fixed on the bottom side end of a tubular structure 2 of the cap 1.

Arranged at the middle on the inside surface of the bottom plate 8 of the lens cap 1 are a reflector or mirror 9 opposite to the window 4 at an angle of 45° and a lens tube 10 that is shorter than the tube 2 and that has a hole 11 positioned opposite to the window 4. A lens 12 is arranged at the end of the lens tube 10. The dial rings are colored milk-white. The ring 5 carries the days, 6 the months and 7 the years.

By turning the dial rings 5, 6 and 7, the figures indicating the date of photographing are positioned into the window 4 provided in the tube 2 of the lens cap 1. Then the lens cap 1 is mounted on the photographing lens of a camera loaded with film. When the window 4 of the lens cap 1 is faced toward the light and the camera shutter is released at a suitable exposure value, the external light passes through the dial rings 5, 6 and 7 in the window 4 is reflected by the reflector 9 to the lens 12. The light then passes further through the photographing lens of the camera to the film. Thus, the date of photographing that is selected by viewing through the window 4 is photographed on the film. It is a matter of common knowledge that the lens cap 1 does protect the photographing lens when the camera is not in use.

While the above-mentioned lens cap has illustrated in FIG. 2 a 45°-inclined reflector at the middle on the inside surface of the bottom plate, a reflector inclined at suitable angles other than 45° may be arranged at other suitable positions than the middle on the inside surface of the bottom plate, depending on the distance between lens and dial or the position where the image is to be photographed on the film. In such instances, the lens is arranged in the path of light from the reflector. Instead of the date of photographing, other suitable photographic data may be marked on the dial rings. This data may be black and the figures may be marked in white.

Figure 3:
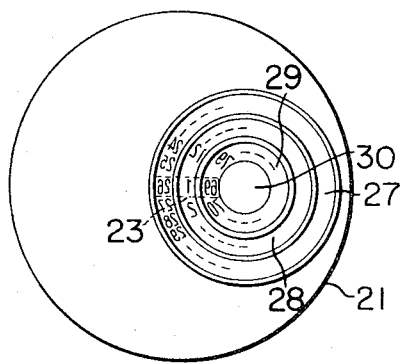
FIG. 3 is a front view of another embodiment of the lens cap according to the present invention.
Figure 4:
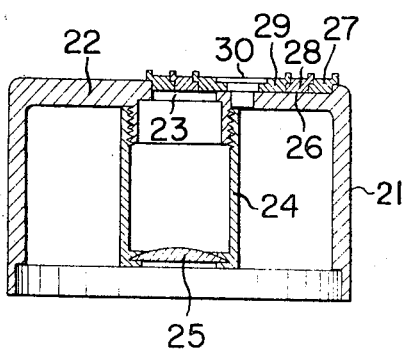
FIG. 4 is a longitudinal section through the lens cap of FIG. 3.

FIGS. 3 and 4 show another embodiment of the lens cap according to the present invention. A window 23 is formed at the middle of the bottom plate 22 of a cylindrical shaped cap 21. A lens tube 24 that is shorter than the tube of the cap 21 and that has a lens 24 at one end is arranged at the inside edge of the window 23. Provided on the external surface of the bottom plate 22 is a circular recess 26 the center of which lies between the center and the circumference of the bottom plate 22 and the radius of which covers the window 23. Annular dials 27, 28 and 29 are rotatably mounted in the recess and having multiple rotatably settable members of the type in which each settable member may be independently chosen and revolved to a selected one of a plurality of set positions and is constructed 26 in the following way: An annular dial 27 having an outer radius equal to the radius of the recess 26 and provided upwardly on the outer periphery with a projection and on the inner periphery with an offset is first inserted into the recess 26. Then an annular dial 28 whose shape is the same as the annular dial 27 and whose outer radius is equal to the inner radius of the dial 27 is fitted in the inner diameter of the dial 27 in such a way that the offset of the dial 27 is held by the projection of the dial 28. A third annular dial 29 is further inserted into the inner diameter of the dial 28 in the same way as above. The offset of the dial 29 is held by the flat head of a flat head screw 30, which is screwed into the inner diameter of the dial 29 for fixing the dials to the bottom plate 22. Part of the dial figures are positioned to face the window 23. The dial 27 carries the days, 28 the months and 29 the years on the milk-white background.

The date of photographing is selected by viewing through the window 23 provided in the bottom plate 22 of the lens cap 21 and by grasping the dials 27, 28 and 29 by the projections and turning them. After the lens cap 21 is attached on the photographing lens of a camera loaded with film, the camera is faced toward the light and the camera shutter is released at a suitable exposure value. The date of photographing is thus photographed on the film in the same way as described before.

What is claimed is:

1. In a photographic camera having a housing for containing film wherein data is recorded on the film by its exposure, a lens cap mounted on said housing, said cap being shaped in the form of a hollow cylinder having an inner surface and an outer surface, said cylinder having an open end and including a circular bottom plate for closing the other end, said bottom plate having a recess offset from the center of said circular bottom plate;

a window provided in said recess for permitting the entrance of light beams through said window;

a lens concentrically mounted with respect to said inner cylindrical surface and arranged in axial alignment with said window for permitting the passage of the light beams from the window to the film;

a plurality of dial rings rotatably mounted in said recess, said rings having multiple rotatably settable members of the type in which each settable member may be independently chosen and revolved to a selected one of a plurality of set positions;

each of said rings having offset portions for tightly engaging one another to provide a compact manipulatable data arrangement within said recess.

* * * * *